United States Patent
Bunker

[11] 3,892,051
[45] July 1, 1975

[54] SIMULATED COLLIMATION OF COMPUTER GENERATED IMAGES

[75] Inventor: William M. Bunker, Ormond Beach, Fla.

[73] Assignee: General Electric Company, Fairfield, Conn.

[22] Filed: Oct. 31, 1973

[21] Appl. No.: 411,519

[52] U.S. Cl. .................... 35/12 N; 178/DIG. 35
[51] Int. Cl. ............................................ G09b 9/08
[58] Field of Search ..... 35/12 E, 12 G, 12 N, 12 W, 35/25, 10.2, 11; 178/6.8, DIG. 35; 235/150.2; 273/101.1; 340/172.5

[56] References Cited
UNITED STATES PATENTS

| | | | |
|---|---|---|---|
| 3,205,303 | 9/1965 | Bradley | 178/6.8 |
| 3,514,871 | 6/1970 | Tucker | 35/12 N |
| 3,619,912 | 11/1971 | Conant et al. | 35/12 N |
| 3,665,408 | 5/1972 | Erdahl et al. | 340/172.5 |
| 3,725,563 | 4/1973 | Woycechowsky | 35/10.2 |

Primary Examiner—Lawrence Charles
Assistant Examiner—Vance Y. Hum
Attorney, Agent, or Firm—Allen E. Amgott; Raymond H. Quist

[57] ABSTRACT

In a training device for pilots, computer-generated images of an external scene as viewed from a cockpit or other pilot stations are presented on a cathode-ray tube or similar display device. In the most nearly similar prior art devices there is no apparent shifting of the viewed scene within the bounds of the display when the observer moves relatively to the display, although such changes would occur in the viewing of an actual distant scene. In the present invention, position sensors attached to the observer's head, or to the movable cockpit of a conventional type of trainer, produce signals which are incorporated in the computation means which generate the image, to alter the image consistently with the alterations which would occur if the scene being simulated were actually viewed directly. It has been found by actual test on student pilots that this produces an illusion of actually looking through a window at an external scene sufficiently complete to permit substitution of training in a simulating trainer for an appreciable part of the training curriculum ordinarily requiring actual flight.

1 Claim, 4 Drawing Figures 3,892,051

SIMULATED COLLIMATION OF COMPUTER GENERATED IMAGES

BACKGROUND OF THE INVENTION

1. Field of the Invention

This invention pertains to the art of simulation type trainers for pilots, such as aircraft pilots.

2. Description of the Prior Art

The training of pilots by simulation, usually in a movable cockpit which simulates the cockpit of a vehicle such as an aircraft, rather than by actual flight in an aircraft, has numerous obvious advantages of which perhaps the most important are economy, and safety in that catastrophes in actual flight are harmless in simulation. Half a centuray ago, open cockpit trainers permitted a student to obtain, by dynamical simulation, a "feel" for the control characteristics of the relatively sluggish craft of that era. The cockpits could easily be hooded for training in instrument flight, and the increasing sophistication of instrumentation required in general only normal engineering skill in providing simulation of the instrument indications, primarily because the instrument indicators themselves were simulators or indicators of some physical fact which was not observed directly. Since instrument flying was generally aimed at permitting piloting without the aid of observation of the external environment, any subjective feeling of artificiality in the simulated environment was no different in quality from the feeling of a pilot actually flying on instruments with negligible vision of the outside, and so contributed to the completeness of the simulation of actual flight instead of impairing it.

For simulation of visually guided flight, the situation is quite different. The student must be provided with an optical illusion that he is actually looking at the outside environment, sufficiently perfect so that not only will he consciously declare that the illusion is complete, but he will establish conditioned reflexes, by reaction to the illusion, which will effectively produce identical reactions to a real external environment like that simulated. An important part of such an illusion is the conveyance to the student of a correct understanding of the relative position and size, in three dimensions, of objects which even his own eyes viewing them directly can present only in two. The perception of three-dimensional relations is a mental, rather than a purely ocular feat. Phenomena which are functions of the distance of viewed objects are: the degree of curvature of the eye lens required to focus an object; the angle between the axes of the two eyes to fuse their view of it, which may be abbreviatedly described as the interocular angle; change in apparent size with distance, commonly called perspective or linear perspective; and the relative displacement of differently distant objects when the observer's viewpoint is changed, commonly called parallax. While focussing effort and interocular angle may be sensed at comparatively close distances with sufficient accuracy to give some rough sense of distance, some cause, probably their small geometrically determined rate of change at ranges of interest in pilot training, precludes their effectiveness. Perspective and parallax, on the other hand, appear as two-dimensional position observations of the eye itself, of a kind which the eye best makes. The eye's subjective determination of brightness, or even of brightness match, is in general far inferior to the accuracy with which it can determine the two-dimensional relationships of parts of a viewed scene. And it appears that this superior ability of the eye cooperates particularly well with the brain in comparing closely successive views of a scene changing either in itself, or in the observer's viewpoint, to produce a correct impression of the three-dimensional realities that are being observed. Successful tests for pilot training of the invention to be described, which does not provide focus or interocular angle simulation, appear consistent with all the above statements.

However, the presentation of images or simulations which are completely deceptive illusions requires the elimination of clues or signals that the display is in fact only a simulation. An actual distant scene being viewed through a window, or simply in the presence of nearby objects, will appear to be displaced relative to them if the observer moves. The success of tests mentioned is credited at least in part to the provision of means to simulate this effect.

Various schemes for simulating views of the external environment for training purposes appear in the prior art. Theoretically less sophisticated are those which employ transparencies, which may be photographic copies of real scenes, or which have actual small models of the outside environment, and in either case present projected views to the student. To produce an illusion of viewing at a distance, the views may be thirty feet or more from the student. This requires a large image, at a long distance, and quite apart from the clumsiness of a device of such dimensions, it creates problems both technical and economic in producing images adequately bright. An alternative is to present to the student's eyes images actually quite small, but collimated so that they appear very distant — what the optical designer, as contrasted with the mathematician, would call "infinitely distant". Such a stratagem has two disadvantages: the efficiency of such a system is quite low, so that brightness is a very real problem. Also, the eye relief — that is, the distance by which the viewing eye may be displaced from the optical axis of the system — is so small in terms of element diameters that either the optical system must be brought quite close to the viewer, or the diameters of its component parts must be made very large. Even small diameter optics are of considerable weight, and bringing them close to an observer in a moving cockpit by mounting them in the cockpit adds an appreciable burden to the merchanics of the trainer. All these considerations have limited the application of these schemes.

Television type visual displays are readily available together with a well developed technology of their use, and are particularly well suited to receive signals from a data-processing type of storage system in which the parameters representing the various features of the simulated outside environment are stored, usually in digital form, and are caused to produce on the display screen a representation of the scene that would be viewed by an observer of the environment simulated.

Cathode-ray tubes may also be employed with conventional television cameras to reproduce views of models or other visual simulations; and it is known to distort the scanning pattern of such displays to simulate the perspective of different view aspects.

U.S. Pat. No. 3,602,702 of Warnock, U.S. Pat. No. 3,621,214 of Romney et al., and U.S. Pat. No. 3,665,408 of Erdahl et al. describe means for producing on a cathode-ray tube a perspective view of a three-dimensional collection of objects described digitally by their boundaries. However, none of these suggest the possibility of altering the display as the viewer's position relative to the display changes.

U.S. Pat. No. 3,725,563 of Woycechowsky describes a method for altering the scan of an image pickup device to produce on a cathode-ray display a perspective view of a scene from, e.g., a photographic transparency for use in connection with a trainer. U.S. Pat. No. 3,650,045 of Wood employs actual movable, servo-controlled vanes to simulate lines in a representation of a landing field, projecting images of the vanes upon a screen. This is necessarily limited in capabilities, and not a substitute for flight training in the general case. U.S. Pat. No. 3,591,933 of Ebeling deals with optical devices for altering the apparent perspective of a motion picture of a predetermined flight path which the trainee attempts to follow. U.S. Pat. No. 3,418,459 of Purdy discloses a method of presenting perspective views of earth, sky, and certain fixed obstacles, the earth and sky being identified by certain arbitrary patterns of ellipses and dots, for various aircraft attitudes. None of these produces illusion to an observer who moves relative to the display.

U.S. Pat. No. 3,205,303 of Bradley employs a very small cathode-ray display and optical system which is fixed relative to the observer's head, to which angular position sensors are also attached. The input to the display is, however, from video cameras which are controlled by the angular position sensor signals to turn to look in the same direction as the observer. The purpose of the device is remote control of an aircraft, not simulation. It is a device for use in actual flight, and hence does not meet the purpose of the training devices elsewhere described. Its obvious disadvantages of weight, and awkwardness, and its obstruction of local vision e.g. of cockpit instrument appear also to be grave possible objections to its use even for its stated purpose. It represents an attempt to make fixed relation of a display to the observer tolerable, not to permit movement of the observer relative to the display. U.S. Pat. No. 2,988,821 of Bolie is merely a specialized display of a geometric pattern representative of a landing strip, and is not capable of generalized training use. U.S. Pat. No. 2,824,304 of Dorsett teaches merely means for determining relative to a ground point a target visible from the air, and has no relation to training.

In summary, the prior art individually or in combination does not teach or suggest the presentation upon a display, close to but not fixed with respect to an observer, of a view of a three-dimensional scene represented by stored data, which appears to move in the viewscreen when the observer moves.

SUMMARY OF THE INVENTION

One or more cathode-ray, light-valve, or similar displays are located before the observer's station, but not necessarily fixed relative to the station, which may be movable as part of a pilot's training simulator. Position sensors produce signals representative of the observer's position. If the observer is relatively fixed in position in e.g. a movable trainer cockpit, sensing of the position of the cockpit may be adequately accurate; if not, sensors may be attached to the observer, preferably to his head, to produce adequately accurate representation of his viewpoint. If a plurality of displays is employed, they will ordinarily face inward around an approximate arc of a circle or segment of the surface of a sphere; and the images displayed upon the various displays will be in register so that the illusion is produced of a wide angle of view of a single distant scene. Standard television-type raster scans are satisfactory, although the number of lines and the definition of picture elements may have to be increased if definition beyond that of ordinary television standards is desired.

Stored representations of the external environment are provided as digital words giving the cartesian coordinates of point light sources or of the end points of lines demarking the boundaries of solids. With these there may be combined additional information of the color of the faces on both sides of the boundaries.

Since it is necessary to consider the observer's actual viewpoint in the simulator relative to the actual display screens, and the simulated station of the observer in the external environment which he has the illusion of seeing through a window, distinguishing definitions will be set here. The actual viewpoint will be called the viewpoint, and the actual display screen will be called the viewscreen. The simulated station in the environment will be called the station point, and the hypothetical window through which he has the illusion of looking will be called the view window.

Some position of the viewpoint will be taken as an origin from which displacements are calculated, and the normal from it to the viewscreen will determine a similar origin 0 in the viewscreen.

A first step in the operation is to compute from the position sensor signals the viewpoint in terms of orthogonal coordinates in which the viewscreen positions and boundaries are also defined. The results of this transformation are then used in a second step to calculate the offset or displacement of the normal to the viewscreen from the origin 0. Since the number of lines in the raster is fixed, vertical offset may be measured by the number of raster lines, and since it is necessary to number the picture elements in a given line to permit visual presentation of numerically defined data, horizontal offset may be measured by the number of picture elements. As part of the same step, there are computed the four tangents of the four angles between the normal from the offset viewpoint to the viewscreen and the left and right and top and bottom edges, respectively, of the viewscreen.

Given the viewpoint, it is evident that the plane determined by an edge of the viewscreen and the viewpoint bounds the solid angle which the viewscreen subtends relative to the viewpoint, and that this solid angle depends upon the viewpoint offset. The solid angle through which an observer at a (simulated) station point can see through a (simulated) window into the (simulated) external environment will be determined by a corresponding plane determined by the station point and the window edge. This latter plane will be called the channel bounding plane — the term "channel" signifying that it pertains to the physical channel leading to the particular viewscreen, since in the general case there will be a plurality of viewscreens. Each channel will (for rectangular viewscreens simulating rectangular windows) have at least one set of four bounding planes, left and right and top and bottom. The reference to "one set" requires explanation at this point.

The various fixed objects in the external environment may conveniently be located with reference to the same set of axes. However, it is desirable to represent moving objects, such as other aircraft, also. As a matter of computational convenience, the parameters of such moving objects may be stored with reference to some origin or central point other than the coordinate system of the fixed environment, and the parameters of the moving object may be transformed to place it properly in the display on the viewscreen. Since the coordinates defining the moving object differ from those of the fixed environment, it will have its own set of bounding planes. The use of different sets of reference coordinates is not confined to rapidly moving targets; it may also be used if, for example, the effect of placing various hazards such as antenna towers or smokestacks in various relations to the airfield is to be studied, or moving cloud patterns are to be represented.

The station point location relative to the origin of each environment system, and the attitude of the view window of each channel in terms of each environment coordinate system (the direction cosine matrices) are computed in this same time period, and hence are part of the same step. These results are employed to be compared with the stored information on location and size of objects in the environment, to determine which objects may appear in the view window associated with the given station point, and to transmit identification of these objects for further processing. This completes the performance of the second step, which is so identified because its various operations are conducted in a given time equal to the period of a single picture frame in the scanning system employed in the displays.

It is required as part of the next step to convert the numerically coded data on points to be displayed, into illumination of a display screen. Any of the television-type display systems may be scanned in a grid or raster of horizontal lines, and a counter may be stepped by the horizontal scan trigger to count the line number, employing the vertical scan trigger to reset the counter to zero. The data concerning the illumination to be provided at each point, or the amount of each of the given color components available in a color display, may be stored in a fast memory prior to the scanning of each line, and read out through a digital-to-analogue converter with the proper lead time so that the raster scan has arrived at the proper element in the selected raster line when the decoded and converted signal is applied to the controls of the display device.

Given the coordinates of the end points of a line to be displayed (which may be the projection of a line in three-dimensional space) the equation in slope form may be computed by standard analytic geometrical formulas, conveniently with the horizontal line number as the independent variable and the horizontal location as the result, which will give the intersection of the displayed line with each raster line. This much is very elementary, included only for completeness of disclosure, to establish that the numerical coordinates of a point automatically permit its presentation on the viewscreen, and the coordinates of the points forming a line may be established by very conventional procedures.

For each view window there is a basis coordinate system in which $u$ is normal from the station point to the viewpoint, $v$ extends in the direction in which the associated display screen raster lines progress in their scan, and $w$ extends in the direction in which the associated display screen raster is scanned vertically, which by the convention of beginning a raster at the topmost horizontal line means that the W coordinate increases downward.

A given set of environment coordinates has an origin of vectors such that a vertex in the environment is located by vector components $X_i$, $Y_i$, $Z_i$ from the origin to the vertex. A vector $R_L$ extending from the environment coordinate origin to the station point locates the station point relative to the environment coordinates; when it is subtracted from the vertex vector, the resulting difference vector is the vertex vector referred to the station point, but not resolved into basis components. This is done by multiplying the difference vector by the matrix of the direction cosines of the station point basis vectors expressed in environment system coordinates, yielding components $U_i$, $V_i$, $W_i$ which define the vertex $i$ in the $u$, $v$, $w$ coordinate system of the station point.

It is to be noted that this procedure may be applied to vertices in several different environment coordinate systems, since there will be a separate $R_L$ for each one and separate direction cosines. The result of the process is to put all vertices regardless of origin into the same coordinate system. This mode of operation has the advantage that a part of the environment, such as another airplane, may be referred to its own system of coordinates, which may conveniently be transformed to the system of any particular problem.

The data transformed to a single set of coordinates are then processed to present to the viewpoint of each viewscreen, regardless of the displacement of the viewpoint within the permissible range of the apparatus, a simulation of the view in the window as seen from the station point. This, however, requires reference to the drawings and so necessarily is properly part of the description of the preferred embodiment.

DESCRIPTION OF THE PREFERRED EMBODIMENT

Figure 1:
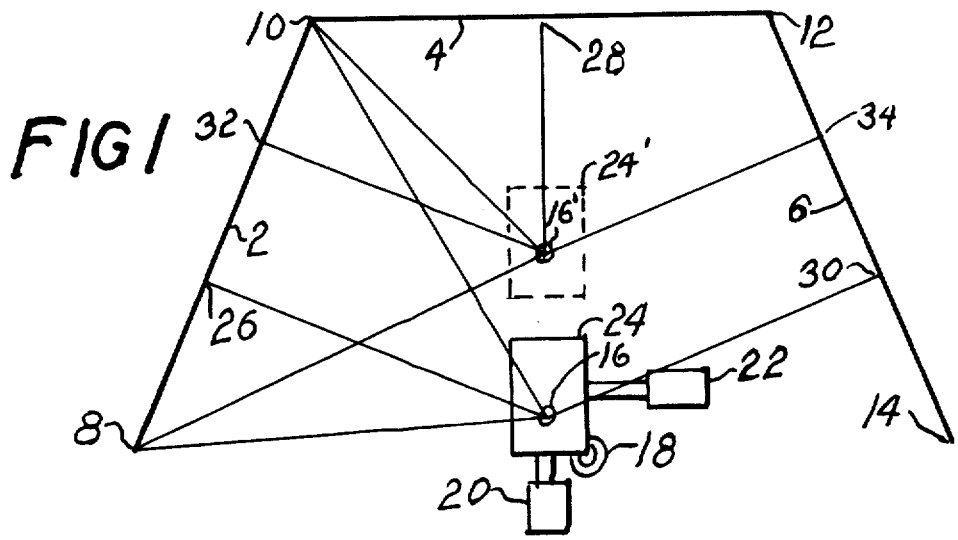
FIG. 1 represents a plan view of an embodiment of three viewscreens, illustrating displacement of the observer's viewpoint.

FIG. 1 represents schematically in plan three tangent viewscreens 2, 4, and 6, having vertical boundaries numbered respectively 8, 10, 12, and 14. A viewpoint 16 is located at its neutral or origin point, from which displacements upward (normal to the drawing), sidewise (horizontally in the drawing), and back and forth (up and down in the drawing plane), may be measured, respectively, by sensors 18, 20, and 22 which are attached to a movable car or cockpit 24. As has been explained previously, it is desired to measure the displacements of the observer's head (or more precisely, the point between the centers of his pupils); but when he is maintained in reasonable approximation to a position fixed in a trainer cockpit, it is simpler and certainly much less annoying to the observer to measure the cockpit displacements and infer his head location from them. In the event that this is not adequately accurate in the particular circumstances, sensors 18, 20, and 22 may be regarded as connected to the observer's head, which would then be reference number 24.

It is evident that FIG. 1 represents equally well a fictitious or simulated station point 16 in its position relative to fictitious or simulated view windows 2, 4, and 6; and that the displacement of a real observer viewpoint 16 necessarily implies a corresponding displacement of fictitious station point which may equally well be represented by 16.

Normals from the undisplaced viewpoint 16 to viewscreens 2, 4, and 6 intersect them at 26, 28, and 30, respectively establishing the origin of viewpoints in each. If the cockpit is displaced forward to 24', the normals from the displaced viewpoint 16' are 32 for viewscreen 2, and 34 for viewscreen 6, giving an offset 26 to 32 for viewscreen 2, and 30 to 34 for viewscreen 6. The normal from viewpoint 16' to viewscreen 4 coincides with that from viewpoint 16, intersecting viewscreen 4 at 28, so that its offset is 28 to 28 — that is, zero. However, this does not mean that the displacement of viewpoint from 16 to 16' is of importance only to viewscreens 2 and 6, and not to 4.

The left half-angle 8-16-26 (using reference points to identify angles, or lines) and right half-angle 10-16-26 for viewpoint 16 and viewscreen 2 are approximately equal; but left half-angle 8-16'-32 is visibly greater, and right half-angle 10-16'-32 is visibly less, for viewpoint 16'. A similar result could be shown for viewscreen 6. For viewscreen 4, it is evident by symmetry that halfangle 10-16-28 and 12-16-28 (not drawn) will be equal; and similarly 10-16'-28 and 12-16'-28 will be equal. But the half-angles for viewpoint 16 will be equal to $\tan^{-1} 10\text{-}28/16\text{-}28$, while for viewpoint 16' they will be $\tan^{-1} 10\text{-}28/16'\text{-}28$; the angles of view will be appreciably increased, and the boundary planes of the window associated with viewscreen 4 will diverge more, which means that more objects in the external environment will be presented on viewscreen 4, rather than on 2 or 6.

Vertical half-angles, upper and lower, cognates of the left- and right-hand horizontal angles, may be determined for up and down displacements measured by sensor 18, producing vertical offsets on the viewscreens 2, 4, and 6.

Figure 2:
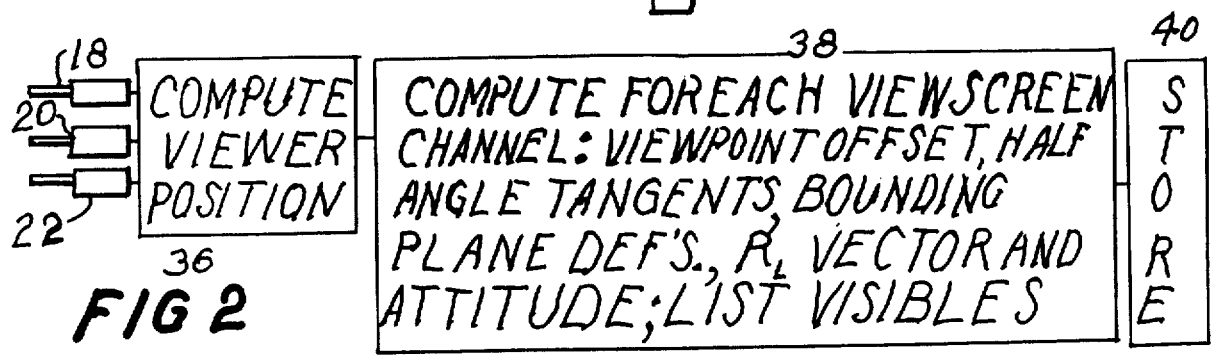
FIG. 2 represents in block diagram form the procedure of preliminary calculation of quantities which will be used in calculation of coordinates of points actually to be presented on a viewscreen.

Referring to FIG. 2, there is represented a rectangle 36 denoting means for or function of receiving signals from sensors 18, 20, 22 and computing therefrom the coordinates of the viewpoint 16' with respect to the coordinates of each viewscreen. (This is necessary in general since the sensor signals may merely indicate displacement from an initial position rather than absolute position.) The results of this computation are transmitted to rectangle 38 (which again may denote a particular piece of hardware or simply a function provided by a large time-sharing computer) where there are calculated, for each viewscreen channel, the viewpoint offsets as vertical and horizontal components and the tangents of the left and right and top and bottom halfangles. The four bounding plane definitions for the station point and view window associated with each channel are also calculated. At this time, also, the coordinates of each object to be represented in the external environment are compared with the bounding plane definitions, and there are transmitted to the next rectangle 40, a store, the identifications of the objects which lie within the bounding planes of each view window, and hence may appear on the associated viewscreen. There are also calculated at this time the vector(s) $R_L$ to the station point from the origin of each environment data store, as previously described, and the direction cosines defining the attitude of the view window of each channel to the given environment coordinate system. (It has been previously explained that a plurality of environment data stores will normally be employed.)

The position and attitude of each view window is prescribed by the program of the trainer. If a student pilot is to begin a session simulating the taking over of the controls of a plane already in flight at a given ground position, altitude, and attitude, the appropriate parameters must be predetermined accordingly. Any changes in these with time, responsively to the student's manipulation of simulated controls, or to the instructor's injection of simulated phenomena such as turbulence or up- or down-drafts, even if they are done by dataprocess equipment which is part of the overall trainer, are nevertheless arbitrary so far as the present invention is concerned. Thus it suffices to state simply that the $R_L$ vector(s) and the direction cosines expressing attitude are calculated in obedience to data provided externally to the method or equipment of the present invention.

The various results calculated as described in the preceding are stored in a store or memory 40 which, since it receives fresh data every scan frame period, is in practice conveniently a semi-conductor device. It is not required to retain stored data for long periods, but serves rather to synchronize the production of the calculated data as outputs with the requirements of equipment farther down the chain for the same data as inputs.

Figure 3:
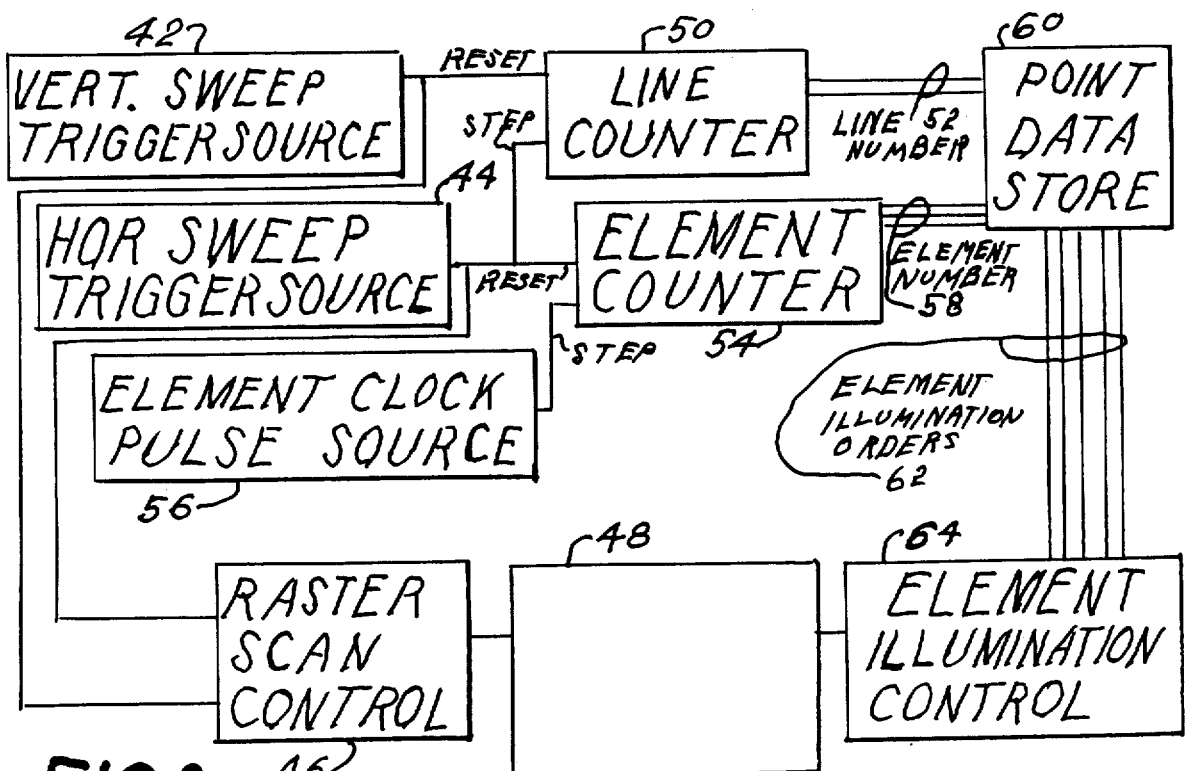
FIG. 3 represents a viewscreen, and shows schematically a conventional means for causing the presentation, in the display, of points identified only by their digital coordinates on the raster.

Since it will assist understanding of the remaining description to explain the nature of the raster scan identification, reference is now made to FIG. 3. A vertical sweep trigger source 42 and a horizontal sweep trigger source 44, both normal parts of the auxiliaries of a raster scan control 46 of a display scanned in horizontal lines moving successively down the viewscreen 48 to form a raster, are connected to a line counter 50. The line counter 50 is reset to zero by the vertical sweep trigger source 42 output, which occurs once every frame and it is stepped by the horizontal sweep trigger source 44 outputs, which occur once every horizontal line. The line number outputs 52 of line counter 50 thus give the ordinal number of the particular raster line being scanned. An element counter 54 is connected to be reset to zero by the output of horizontal sweep trigger source 44, and to be stepped by clock pulse source 56, whose period is the duration of one definable element of a horizontal line of the raster. Thus element number outputs 58 of element counter 54 represent the ordinal number of the particular line element being scanned. Line number outputs 52 and element number outputs 58 are connected as readout address inputs to point data store 60. This is a fast memory in which there are stored, under proper raster coordinate addresses (or in a sequence which constitutes the equivalent of such addresses), the encoded instructions for illuminating the particular picture element addressed. Responsively to the line and element number address signals, point data store 60 reads out element illumination orders via channels 62 to element illumination control 64, which causes the ordered illumination of the picture element being scanned at the moment.

It will be realized that what is being described is a reading out of point data instructions synchronously with the scanning of the raster of viewscreen 48, and that in practice some lead time will be required between the addressing of the memory and the actual scanning of the spot addressed. This need may be met in numerous ways ranging from the provision of delays between horizontal sweep trigger source 44 and raster scan control 46, which is the instinctive engineering approach, to a simple modification of the point addresses to provide lead time automatically. It will also be appreciated that point data source 60 will in many practical instances be in two sections which alternate in being filled with data and in being read out, in order that the flow of data through store 60 to the display 48 may be continuous. Since raster displays have been the subject of active development for over four decades, the known art offers many ways of executing these principles.

Figure 4:
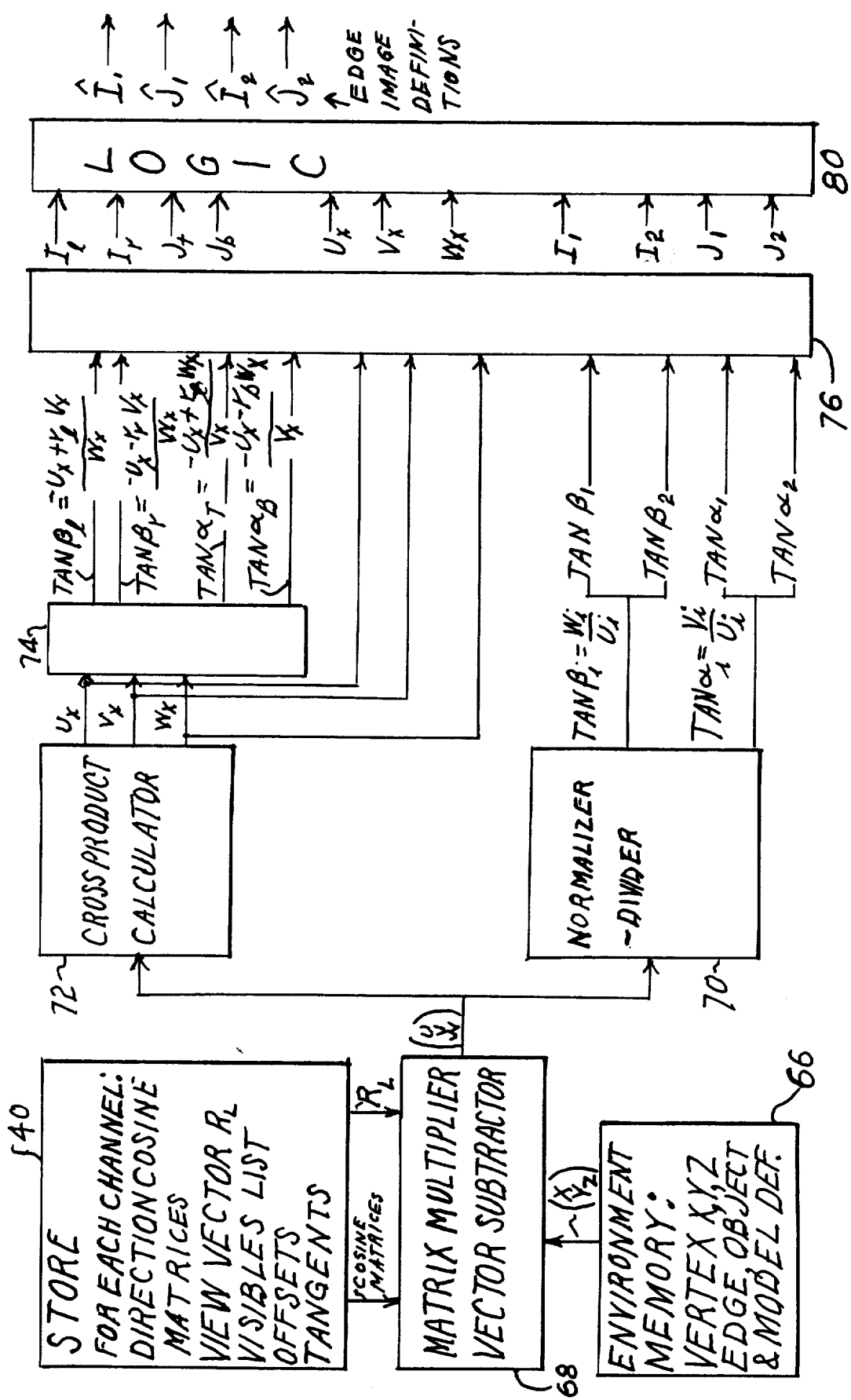
FIG. 4 represents the computation scheme and means for the calculation of the coordinates of points to be presented on a viewscreen.

FIG. 4 represents the processing of data stored in memory 40, which is repeated in this drawing for convenience. Rectangle 66 is a store of environment parameters (meaning thereby coordinates X, Y, Z of single points which may be identified as individual vertices, or paired to define end points of a line, or may be taken in larger grouping to define the perimeter of a plane surface, or surfaces) expressed in terms of the particular environment coordinate system and origin. The vector $R_L$ from the station point of the view window under consideration has been determined, and stored in store 40; and the direction consine matrix for the U, V, W coordinate system of the view window has also been calculated and stored in store 40. These are transmitted from store 40, and the various point coordinates from store 66 are also transmitted to matrix multiplier 68 which produces as outputs the coordinates of the points from store 66 transformed to the U, V, W system. This is done by subtracting the $R_L$ vector from the X, Y, Z, vector and then multiplying by the cosine matrix. This yields, for a given vertex in the environment, the components $U_i$, $V_i$, $W_i$ of the vector to the vertex from U, V, W, origin. Because the presentation is to be in a rectangularly scanned raster coordinate system, it is useful to obtain the tangent of the angle between the projection on the U, V plane of the vertex vector, and the U basis vector, definable as $\alpha_i$, whose tangent is equal to $V_i/U_i$. Similarly, it is useful to obtain the tangent of the angle between the projection of the vertex vector on the U, W plane and the U basis vector, which angle is definable as $\beta_i$, and whose tangent is equal to $W_i/U_i$. Block 70 calculates both of these by performing the indicated division.

As was previously indicated, the environment store 66 contains vertices which are associated in pairs as ends of a line, or in numbers greater than two as vertices of surfaces bounding solids. For each edge in the environment, cross product calculator 72 receives from matrix multiplier pairs of coordinates $U_1$, $V_1$, $W_1$ and $U_2$, $V_2$, $W_2$ and calculates the components of their cross product, designated as $U_X$, $V_X$, $W_X$, the capital X subscript indicating "cross".

These results are subjected to further computation, represented by rectangle 74, which receives the above identified cross product terms, and the half-angle tangents mentioned as being stored in store 40, and produces therefrom the following:

$$\text{Tan } \beta_l = \frac{-U_X + r_l V_X}{W_X}$$

$$\text{Tan } \beta_x = \frac{-U_X - r_r V_X}{W_X}$$

$$\text{Tan } \alpha_t = \frac{-U_X + r_t W_X}{V_X}$$

$$\text{Tan } \alpha_b = \frac{-U_X - r_b W_X}{V_X}$$

where $r_l$, $r_r$, $r_t$, $r_b$ signify, respectively the tangents of the left, right, top, and bottom half-angles.

This is an appropriate point at which to mention that both for the tangents here derived, and for the half-angle tangents, any half-angle tangents which exceed a preselected maximum, usually unity or two, and any of the tangents here derived which exceed the maximum value for an "on-screen" point, are disregarded as to numerical value, and have only their sign retained for application to subsequent logic.

Calculation will now enter into quantitive specification of viewscreen coordinates. The raster line number for a point $k$ will be identified as $I_k$, counting from the top of the raster downward, there being a total of $m$ lines in the raster, so that the middle line will be identified by $m$12. The element number will be $J_k$, beginning from the left end of the raster line, the total number of elements in a line being $n$, and the midpoint of the line being thus identified by $n$12.

Rectangle 76 performs the following calculations:

$$I_k = \left(\frac{m}{2} + I_o\right) + \frac{m}{r_t + r_b} \text{Tan } \beta_K$$

$$J_k = \left(\frac{n}{2} + J_o\right) + \frac{n}{r_l + r_r} \text{Tan } \alpha_K$$

The significance of the subscript $k$ requires explanation. It takes the values 1 and 2 to signify the calculation of the coordinates of the end points of a line (which will often itself be the edge marking the intersection of two planes). However, there is no convenient way of determining a priori whether these end points will both be visible in the view window, or whether the edge will lie so that it intersects one or two view window bounding planes, in which case one or both of the end points will lie outside of the view window bounds; or whether the entire edge will lie outside of the view window. If one images the planes bounding the view window to be represented in the viewscreen plane, they will appear as two vertical lines and two horizontal lines, ordinarily lying at the boundaries of the physical viewscreen, but extending without limit in the plane of the viewscreen. If the two end points $I_1$, $J_1$ and $I_2$, $J_2$ of a line marking an edge intersection of two planes are plotted in the imagined viewscreen plane, they will define a line; and this line, unless it happens to be perfectly parallel either to the vertical or the horizontal planes, will intersect the traces of all four bounding planes. These intersections will be taken to correspond to values of the subscript $k$ which are $r$ and $l$ for the right and left bounding planes, and $t$ and $b$ for the top and bottom bounding planes. This, added to the original values 1 and 2 of $k$, leads to six possible values. The I and J values are calculated for all of them, in calculation rectangle 76. The various I and J values resulting are transmitted to logic rectangle 80, which by comparing the coordinates of the six different values of $k$, determines which two (if any) represent the end points which should be represented on the viewscreen to simulate the edge of the given plane intersection.

The determination or selection of the end point coordinates is performed for all of the points listed in the object list in store 40, and the faces formed by the edges defined by these coordinates are appropriately illuminated on viewscreen 48 by storage of the viewscreen point coordinates and illumination orders in point data store 60 of FIG. 3, in accordance with its previously described function. The means for determining appropriate presentation and illumination are part of the conventional art of computer generated images, for example that of Erdahl, which is incorporated herein by reference. Specifically, Erdahl at column 4, lines 63 through 69, states: "Operatively, digital signals representative of the boundary definitions are generated by the computer or input device 12 and supplied to the display generator 10. The boundary definitions are then processed by the display generator 10 to generate intensity control signals for each part in the order in which they appear in the scanning pattern of the particular display device utilized." Element 80 of the present application's FIG. 4 produces such boundary or edge definitions, and hence may serve as Erdahl's input device 12. Erdahl at column 21, line 73 indicates the possibility of feeding his output to a storage device, which is provided by reference 60 of the present application's FIG. 3.

The preferred embodiment has been described with respect to only a single viewscreen and associated channel. Ordinarily, a plurality of viewscreens side by side and one upon another will be employed, controlled by separate channels. But the registry of their separate images will be effected by appropriate definition of their attitudes and view windows so that the total effect of looking at the combined array will simulate looking out of different panes of a large window at a single scene.

As has been indicated previously, it has been established by tests upon groups of pilots actually in a regular training curriculum that a large number of hours ordinarily spent in actual flight in the standard curriculum can be replaced by simulated flight in a trainer employing the present invention, with results not inferior to those obtained with a control group in the standard curriculum. While the practice of the invention must necessarily be in mechanical terms, the unpredictable benefit lies in its producing illusion sufficiently complete to permit its effective substitution for reality in so grossly practical a matter as pilot training.

While description has been primarily in terms of training aircraft pilots, the same invention may be applied to training marine pilots, or to training control tower operators who require the illusion of looking into distance, and who are free to move much more than pilot trainees in trainer cockpits. For general definition, item 66 of FIG. 4 may be described as a store of numerical data descriptive of the environment; item 48 as a two-dimensional viewscreen adapted to be controllably illuminated at numerically described viewpoint coordinates; the direction cosine matrices, view vector $R_L$ components stored in 40 constitute a store of numerically encoded view window data; and the various data processing means comprised in reference 38, and even-numbered references 68 through 80, plus the data-processing means disclosed by Erdahl may be described simply as data-processing means. References 18, 20, and 22 are linear displacement measuring means which, with reference 36 generate numerical signals representative of the displacements they measure.

I claim:

1. In an aircraft trainer apparatus for simulating a view of a distant three-dimensional environment by a nearby numerically controlled two-dimensional presentation, comprising:
    a. a store of numerical data descriptive of the environment, comprising numerically encoded geometric and visual parameters of the environment together with their three-dimensional coordinates therein;
    b. a two-dimensional viewscreen adapted to be controllably illuminated at numerically described viewpoint coordinates;
    c. a store of numerically encoded view window data descriptive of the attitude and location relative to the environment recited in (a) of a fictitious aircraft view window which is simulated by the viewscreen;
    d. data processing means connected to the store of environmental data recited in (a) and to the store of view window data recited in (c) to receive data from the said two stores and to calculate therefrom the viewscreen coordinate points which, referred to a given observer viewpoint, simulate points in the environment visible through the view window from a given fictitious station point, and to control the viewscreen to be illuminated at those points to simulate the encoded visual parameters of the simulated points;

the improvement comprising:
    e. linear displacement measuring means for measuring three-dimensional displacements of an observer from the given observer viewpoint recited in (d), and for generating responsively thereto numerical signals respresentative of the said displacements, connected to data processing means recited in (d), which responsively thereto calculates the viewscreen coordinate points which, referred to the observer viewpoint displaced from the given observer viewpoint, simulate points in the environment visible through the view window from a correspondingly displaced fictitious station point, and to control the viewscreen of said aircraft trainer to be illuminated at those points to simulate the encoded visual parameters of the simulated points.

* * * * *